L. N. ROBINSON.
PROTECTIVE DEVICE FOR ELECTRIC CIRCUITS.
APPLICATION FILED NOV. 28, 1916.

1,296,558.

Patented Mar. 4, 1919.

WITNESS

INVENTOR.
Lloyd N. Robinson
BY
Acker & Totten
ATTORNEYS

UNITED STATES PATENT OFFICE.

LLOYD N. ROBINSON, OF BERKELEY, CALIFORNIA.

PROTECTIVE DEVICE FOR ELECTRIC CIRCUITS.

1,296,558.  Specification of Letters Patent.  Patented Mar. 4, 1919.

Application filed November 28, 1916. Serial No. 133,863.

*To all whom it may concern:*

Be it known that I, LLOYD N. ROBINSON, a citizen of the United States, residing at Berkeley, in the county of Alameda and State of California, have invented certain new and useful Improvements in Protective Devices for Electric Circuits, of which the following is a specification.

The present invention relates to means for the protection of electric circuits, machinery and apparatus from the effects of alternating and oscillatory voltages and currents of abnormal frequency, and is particularly useful for the protection of alternating current systems employing long distance transmission circuits. The invention is valuable however, in connection with systems other than those mentioned, including direct current systems.

The destructive effects of currents of abnormally high frequency, particularly upon inductive apparatus, are well known. Disturbances of this character may not produce a sufficient increase in current flow to operate the usual current responsive protective devices, nor a sufficient rise in voltage to operate the voltage responsive devices, such as lightning arresters, and yet on account of their abnormal frequency, they may cause serious damage to the system.

Arcing short circuits or grounds resulting from lightning strokes or other abnormal occurrances in an electric circuit, give rise to voltages or currents, or both, of abnormal frequency or of abnormal wave front. While the initial creation of an arc usually requires an excessive difference of potential, after once produced, the arc will ordinarily be maintained by the normal supply voltage of the circuit. Hence if the supply voltage can be sufficiently reduced to eliminate the arc before the insulation of the circuit has been permanently damaged, the normal supply voltage can then be applied to the circuit and operation resumed. Or if the insulation between the conductor and ground has been permanently damaged, as in the case of an arcing ground in a cable distribution system; if the conductor, whose insulation is permanently damaged, is connected permanently to ground at a power or sub-station, operation may generally be resumed until opportunity arises for repairing or replacing the damaged insulation. Hitherto, several different means have been employed for detecting arcing grounds and for actuating control devices; but these means have given varying degrees of protection and satisfaction because they depend on voltages or currents of excessive magnitude or upon substantial electrostatic unbalances between the conductors of the circuit.

Instead of depending upon voltages or currents of great magnitude or upon electrostatic unbalances to detect abnormal conditions and to actuate the necessary indicating or automatic control devices, I employ, in my invention, a combination circuit so that the operation of indicating or control devices depends primarily upon the frequency or equivalent frequency, and only secondarily upon the magnitude of the current or voltage of that frequency, and I employ this combination in such manner that the efficiency and regulation of the main circuit are not materially affected or impaired under normal operating conditions.

In order to comprehend the invention, reference should be had to the accompanying drawings, wherein—

Figure 1:
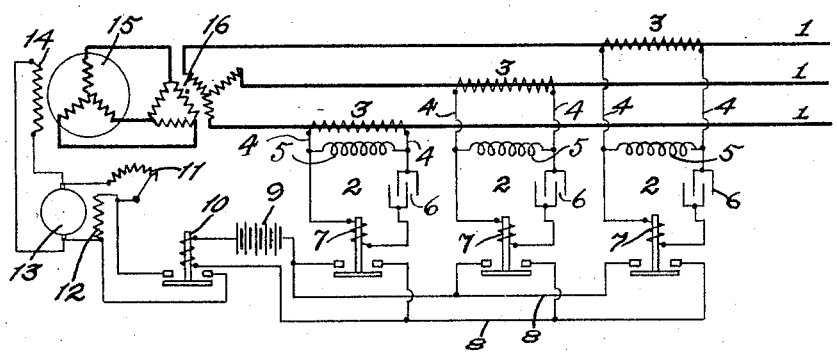
Figure 1 is a diagram showing one form of my device as applied to a transmission circuit for the protection thereof against currents of abnormal frequencies, and adapted to automatically restore said circuit to its normal condition upon the cessation of the high frequency disturbance.

In the drawings, and referring more particularly to Fig. 1 thereof, the reference numerals 1 designate the conducting wires of the circuit to be protected, as, for example, a power transmission line. A protective circuit 2 is connected with each of said line wires 1, by means of a series transformer 3. Each of said protective circuits 2 comprises lead wires 4, across which is connected an inductance coil 5, and a condenser 6, and a control device 7 herein shown as a relay of relatively low inductance, said relay and condenser being connected in series in said circuit 2.

In the arrangement illustrated in Fig. 1 of the drawings, the control relays 7 are adapted to close a control circuit comprising lead wires 8, a source of electric current 9 and a relay 10. The relay 10 is adapted to short circuit through an adjustable resistance 11, the field coils 12 of an exciter 13, the latter providing the current for the excitation of the field coils 14 of the main alternating current generator 15 of the transmission system. A transformer 16 is shown interposed between said generator and the transmission line 1.

It will be seen that a current is caused to flow in each of the protective circuits 2, said current being induced by the series transformer 3. The reactances of the inductance coil 5 and the condenser 6 are so proportioned that under the normal operating frequencies of the transmission line, practically all of the current induced in the protective circuit 2, flows through said inductance coil 5. However, as is well known, the reactance of said inductance coil 5 will increase, and the reactance of the condenser 6 will decrease, substantially as the frequency of the current in the circuit 2 increases. Therefore, in the event of a current of abnormally high frequency flowing in one of the line wires 1, a current of similar frequency will be induced in the protective circuit 2 connected with said line wire, and said high frequency current will flow more through the condenser 6, and the relay 7, and less through the inductance coil 5. The relay will thereupon close the control circuit 8, which will result, in the manner previously described, in the reduction of the field excitation of the generator 15.

After the cessation of the high frequency disturbance, the current flowing in the portion of the protective circuit 2 which includes the condenser 6 and the relay 7 will be reduced, thereby allowing said relay 7 to open to restore the field current of the generator. Thus if the high frequency disturbance be caused by an arcing ground, or a flash-over between conductors of the transmission line, or other similar causes, the reduction of the normal line voltage from the generator will put out the arc causing the disturbance, and if the insulation of the circuit is not permanently damaged by said arc, normal operation will be at once resumed.

It is obvious that my protective device may be connected in any one of a number of ways with the circuit to be protected, and moreover, may be applied to the control of said circuit in many different ways. For example, in Fig. 2 of the drawings, I have shown the protective circuit 2 as connected with the line wires 1 by means of a potential transformer 18, so that said circuit 2 will be responsive to high frequency voltage disturbances between said line wires 1, rather than to high frequency current disturbances, as is the case in the connecting arrangement illustrated in Fig. 1.

Figure 2:
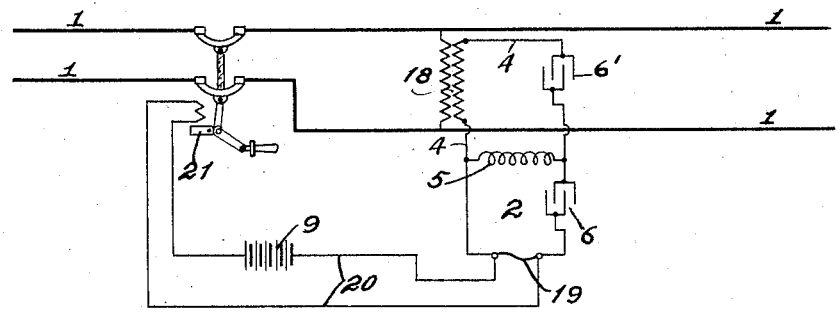
Fig. 2 is a diagram showing my device as applied to a two wire circuit and adapted to open said circuit in response to high-frequency voltage disturbances therein.

In the form of the device illustrated in Fig. 2 of the drawings, the protective circuit 2 includes the secondary winding of the potential transformer 18, two condensers 6 and 6', the shunt inductance coil 5, and a fuse or electrothermal device 19, the latter taking the place of the relay 7 of the previously described form. The fuse 19 also forms a part of a control circuit 20, which includes a source of electric energy 9 and a magnetic cut-out 21, the latter being designed to open the main transmission line.

Thus in the event of a high frequency voltage disturbance between the wires 1 of the line, an abnormal current of high frequency will be induced in the protective circuit 2 and a sufficient proportion of said current will flow through the fuse 19 to melt the same, thereby opening the control circuit 20, and releasing the magnetic cut-out 21 to open the line.

In the form of the device illustrated in Fig. 2, I have shown two condensers 6 and 6' included in the protective circuit 2, the inductance coil 5 being shunted across the condenser 6 and the fuse 19. The use of the two condensers, having reactances properly proportioned to the reactance of the inductance coil 5, connected in this manner renders the circuit 2 more responsive to voltages of abnormal frequencies for the same degree of responsiveness to voltages of normal frequency than would be the case if the condenser 6' were omitted or if the inductance coil 5 were omitted. In the system involving two condensers 6 and 6', having reactances properly proportioned to the reactance of the inductance coil 5, the current in the control device or fuse 19, for a given voltage impressed on the circuit 2, will vary substantially as the second power of the frequency of said voltage; whereas, if the condenser 6' were omitted, or if the inductance coil 5 were omitted, the current in the control device or fuse 19, for a given voltage impressed on the circuit 2, would vary substantially as the first power of the frequency of said voltage.

The invention is not limited to the forms and methods of application herewith illustrated, and herein described. For instance, the protective circuit 2 may be connected directly in the circuit to be protected, instead of inductively as shown, and the control device may be arranged to operate in any desired manner and to produce any desired effect upon the circuit to be protected, or, if so desired, a suitable indicating device may be substituted for said control device. The device is not limited to use with alternating current circuits, but may be included in direct current circuits, such, for example, as those used in railway operation. In any case the device may be arranged to be responsive to disturbances, either in current, voltage, or potential, of abnormal frequencies.

Having thus described the invention, what is claimed as new and desired to be protected by Letters Patent is:—

1. A protective device for electric circuits, comprising an auxiliary circuit connected with the circuit to be protected, an electrostatic condenser and an electrothermal device included in series in said auxiliary circuit, an inductance coil shunted across said condenser and said electrothermal device, and means for connecting said electrothermal device with the main circuit for the control thereof.

2. A protective device for electric circuits, comprising an auxiliary circuit connected with the circuit to be protected, an electrostatic condenser included in said auxiliary circuit, a control circuit, an electrothermal device connected with said condenser and with said control circuit so as to regulate the current in the control circuit in response to current in the auxiliary circuit, and means for connecting said control circuit with the protected circuit for the control of the latter.

3. A protective device for electric circuits, comprising an auxiliary circuit connected with the circuit to be protected, an electrostatic condenser included in said auxiliary circuit, a control circuit, a fuse connected in series with said condenser and said control circuit, and means for connecting said control circuit with the protected circuit for the control of the latter.

4. A protective device for electric circuits, comprising an auxiliary circuit connected with the circuit to be protected, an electrostatic condenser included in said auxiliary circuit, a control circuit, an electrothermal device connected in series with said condenser and said control circuit, and means for connecting said control circuit with the protected circuit for the control of the latter.

5. A protective device for electric circuits, comprising an auxiliary circuit connected with the circuit to be protected, an electrostatic condenser and an inductance coil in parallel and included in said auxiliary circuit, a control circuit, a fuse connected in series with said condenser and said control circuit, and means for connecting said control circuit with the protected circuit for the control of the latter.

6. A protective device for electric circuits, comprising an auxiliary circuit connected with the circuit to be protected, an electrostatic condenser included in said auxiliary circuit, an electrothermal device connected in series with said condenser, and means for connecting said electrothermal device with the protected circuit for the control of the latter.

7. A protective device for electric circuits, comprising an electrothermal device combined with means for automatically admitting from the protected circuit to the said electrothermal device relative amounts of currents of different frequencies dependent upon the respective frequencies of said current and means for connecting the electrothermal device with the protected circuit for the control of the latter in response to said currents.

8. In combination with an electric circuit, a divided auxiliary circuit connected thereto, the parallel portions of said auxiliary circuit having impedances whose ratio varies with variation of frequency, an electrothermal device connected in one portion of said auxiliary circuit, and means for connecting said electrothermal device to the main circuit for the control of the latter.

9. In combination with an electric circuit, a divided auxiliary circuit connected thereto, the parallel portions of said auxiliary circuit having reactances whose ratio varies with variation of frequency, an electrothermal device connected in one portion of said auxiliary circuit, and means for connecting said electrothermal device to the main circuit for the control of the latter.

10. A protective device for electric circuits, comprising a divided auxiliary circuit connected with the main circuit, an electrostatic condenser included in one portion of said auxiliary circuit and an inductance coil included in the other portion thereof, said condenser and said inductance coil being connected in parallel, an electrothermal device included in one portion of said auxiliary circuit, and means for connecting said electrothermal device with the protected circuit for the control of the latter.

11. A protective device for electric circuits, comprising a divided auxiliary circuit, an electrostatic condenser in one portion of said auxiliary circuit and an inductance coil included in the other portion thereof, said condenser and said inductance coil being in parallel, and an electrothermal device included in one portion of said auxiliary circuit, said electrothermal device being responsive to current flowing therein.

12. A protective device for electric circuits, comprising a frequency selective circuit electrically connected to the circuit to be protected, an electrothermal device connected to said frequency selective circuit and responsive to currents flowing in the latter, and means for connecting the electrothermal device to the protected circuit for controlling the latter.

13. A protective device for electric circuits, comprising a frequency selective circuit electrically connected to the circuit to be protected, an electrothermal device connected in series in said frequency selective circuit and responsive to currents flowing in the latter, and means for connecting the electrothermal device to the protected circuit for controlling the latter.

14. A protective device for electric circuits comprising a frequency selective circuit inductively connected to the circuit to be protected, an electrothermal device connected to said frequency selective circuit and responsive to currents flowing in the latter and means for connecting the electrothermal device to the protected circuit for the control of the latter.

15. A protective device for electric circuits, comprising a frequency selective circuit inductively connected to the circuit to be protected, an electrothermal device connected in series in said frequency selective circuit and responsive to currents flowing in the latter, and means for connecting the electrothermal device to the protected circuit for the control of the latter.

16. A protective device for electric circuits, comprising two parallel frequency selective circuits connected to the circuit to be protected, an electrothermal device connected in series in one of the frequency selective circuits and responsive to currents flowing therein, and means for connecting the electrothermal device to the protecter circuit for the control of the latter.

In testimony whereof I have signed my name to this specification in the presence of two subscribing witnesses.

LLOYD N. ROBINSON.

Witnesses:
W. F. BOOTH, Jr.
D. B. RICHARDS.

Copies of this patent may be obtained for five cents each, by addressing the "Commissioner of Patents, Washington, D. C."